United States Patent
Gallhauser

(10) Patent No.: US 11,184,091 B2
(45) Date of Patent: Nov. 23, 2021

(54) SIGNAL GENERATION DEVICE, SPECTRUM ANALYZING DEVICE AND CORRESPONDING METHODS WITH CORRECTION PARAMETER

(71) Applicant: Rohde & Schwarz GmbH & Co. KG, Munich (DE)

(72) Inventor: Markus Gallhauser, Freising (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/940,397

(22) Filed: Mar. 29, 2018

(65) Prior Publication Data

US 2019/0305857 A1 Oct. 3, 2019

(51) Int. Cl.
*H04B 17/00* (2015.01)
*H04B 17/15* (2015.01)
*H04B 17/29* (2015.01)

(52) U.S. Cl.
CPC ............. *H04B 17/15* (2015.01); *H04B 17/29* (2015.01)

(58) Field of Classification Search
CPC ................................. H04B 17/15; H04B 17/29
USPC ....................................................... 455/67.14
See application file for complete search history.

(56) References Cited

U.S. PATENT DOCUMENTS

| | | | | |
|---|---|---|---|---|
| 6,785,625 B1 * | 8/2004 | Fan | ........................ | G01R 27/28 702/117 |
| 7,392,018 B1 * | 6/2008 | Ebert | ................. | H04B 17/0085 455/42 |
| 7,398,056 B1 * | 7/2008 | Ebert | ................. | H04B 17/0085 455/42 |
| 7,865,319 B1 * | 1/2011 | Jacobs | ................. | G01R 35/005 702/57 |
| 8,620,301 B1 * | 12/2013 | Hessel | ................... | H04W 24/02 455/423 |
| 9,780,988 B2 * | 10/2017 | Alexander | .......... | H04L 27/2688 |
| 2002/0196877 A1 * | 12/2002 | Matis | ................ | H04L 25/03006 375/346 |
| 2003/0115008 A1 * | 6/2003 | Doi | .................... | G01R 1/06772 702/117 |
| 2003/0153273 A1 * | 8/2003 | Ebert | .................... | H04L 1/0001 455/67.14 |
| 2004/0138838 A1 * | 7/2004 | Scheiner | ................ | G01B 7/105 702/64 |
| 2004/0174172 A1 * | 9/2004 | Kamitani | ............... | G01R 27/28 324/500 |
| 2006/0154610 A1 * | 7/2006 | Rumney | ................ | H04B 17/11 455/67.14 |

(Continued)

FOREIGN PATENT DOCUMENTS

WO 2007014280 A2 2/2007

*Primary Examiner* — April G Gonzales
(74) *Attorney, Agent, or Firm* — Ditthavong, Steiner & Mlotkowski

(57) ABSTRACT

A signal generation device with correction parameter measurement is provided. Said signal generation device comprises a signal generating unit configured to provide at least one test signal for a device under test with the aid of a connection structure, and a correction parameter measurement unit configured to measure at least one correction parameter with respect to said connection structure. In this context, both the signal generating unit and the correction parameter measurement unit are integrated into one housing.

17 Claims, 5 Drawing Sheets

(56) References Cited

U.S. PATENT DOCUMENTS

| | | | | |
|---|---|---|---|---|
| 2006/0155498 | A1* | 7/2006 | Dunsmore | G01R 27/28 702/107 |
| 2008/0056340 | A1* | 3/2008 | Foegelle | H04B 17/29 375/224 |
| 2008/0258738 | A1* | 10/2008 | Martens | G01R 27/28 324/601 |
| 2010/0049453 | A1* | 2/2010 | Watanabe | G01R 31/31924 702/58 |
| 2010/0190448 | A1* | 7/2010 | Kuwana | G01R 31/3191 455/63.1 |
| 2013/0134990 | A1* | 5/2013 | Atkinson | G01R 35/005 324/601 |
| 2013/0216005 | A1* | 8/2013 | Chaudhary | H04L 27/2331 375/324 |
| 2013/0317767 | A1* | 11/2013 | Mori | G01R 27/28 702/57 |
| 2015/0024694 | A1* | 1/2015 | Wolanin | H04W 24/06 455/67.14 |
| 2015/0084656 | A1* | 3/2015 | Pickerd | G01R 27/28 324/750.01 |
| 2015/0198523 | A1* | 7/2015 | Dunsmore | G01R 27/32 356/446 |
| 2015/0369849 | A1* | 12/2015 | Betts | G01R 27/32 324/638 |
| 2016/0077158 | A1* | 3/2016 | Yamashita | G01R 31/3191 702/123 |
| 2016/0285572 | A1* | 9/2016 | Manghal | H04B 17/345 |
| 2016/0329973 | A1* | 11/2016 | Goetz | H04B 17/17 |
| 2017/0016953 | A1* | 1/2017 | Beer | G01R 27/28 |
| 2017/0093509 | A1* | 3/2017 | Kyosti | H04W 24/06 |

* cited by examiner though the necessity of an external signal can further be reduced by -->
SIGNAL GENERATION DEVICE, SPECTRUM ANALYZING DEVICE AND CORRESPONDING METHODS WITH CORRECTION PARAMETER

TECHNICAL FIELD

The invention relates to a signal generation device, a spectrum analyzing device and corresponding methods with correction parameter measurement.

BACKGROUND ART

Generally, in times of an increasing number of applications providing or processing signals, especially radio frequency signals, there is a growing need of a signal generation device, a spectrum analyzing device, and corresponding methods especially in order to verify the proper functioning of said applications in an efficient and accurate manner.

US 2015/0369849 A1 relates to a method for determining operating characteristics of a signal generator. Said method includes performing a first set of measurements of an output signal generated by the signal generator and corresponding reflected signal, where the first set of measurements is performed over multiple frequencies and amplitudes of the output signal; applying an external signal to the output port of the signal generator; performing a second set of measurements of the output signal and corresponding reflected signal while the external signal is being applied to the output port, where the second set of measurements is performed over frequencies and amplitudes of the output signal, the external signal having the same frequency as the output signal for each measurement of the second set of measurements. A set of coefficients describing the operating characteristics of the signal generator is determined by processing results of the first and second sets of measurements through a non-linear model. As it can be seen, due to the necessity of an external signal, neither efficiency nor accuracy can be ensured.

Accordingly, there is a need to provide a signal generation device, a spectrum analyzing device and corresponding methods for investigating a device under test, whereby measurement efficiency and accuracy are especially ensured.

SUMMARY OF THE INVENTION

According to a first aspect of the invention, a signal generation device with correction parameter measurement is provided. Said signal generation device comprises a signal generating unit configured to provide at least one test signal for a device under test with the aid of a connection structure, and a correction parameter measurement unit configured to measure at least one correction parameter with respect to said connection structure. In this context, both the signal generating unit and the correction parameter measurement unit are integrated into one housing. Advantageously, in this manner, not only measurement efficiency but also accuracy can be ensured.

According to a first preferred implementation form of the first aspect of the invention, the at least one correction parameter is measured on the basis of the at least one test signal, especially provided for a first port of the connection structure, and at least one measured signal, especially measured at the first port of the connection structure and/or at a second port of the connection structure with the aid of the correction parameter measurement unit. Advantageously, measurement accuracy can further be increased.

According to a further preferred implementation form of the first aspect of the invention, the at least one test signal is a radio frequency signal, preferably a complex signal, more preferably a complex radio frequency signal. Advantageously, measurements are not limited to a certain kind of signal.

According to a further preferred implementation form of the first aspect of the invention, the signal generation device comprises a correction parameter measuring mode. Advantageously, said correction parameter or at least one correction parameter, respectively, can be measured in a most efficient manner.

According to a further preferred implementation form of the first aspect of the invention, the correction parameter measurement unit is configured to compare the at least one test signal, especially provided for a first port of the connection structure, with at least one measured signal, especially measured at the first port of the connection structure and/or at a second port of the connection structure with the aid of the correction parameter measurement unit. Advantageously, measurement errors can further be reduced.

According to a further preferred implementation form of the first aspect of the invention, the at least one correction parameter comprises at least one scattering parameter of the connection structure. Advantageously, measurement accuracy can further be increased especially by correcting the respective frequency response.

According to a further preferred implementation form of the first aspect of the invention, the signal generation device is configured to indicate the at least one correction parameter to a user. Additionally or alternatively, the correction parameter measurement unit is configured to indicate the at least one correction parameter to the user. Advantageously, measurements can be performed in a time-saving, and thus also efficient, manner.

According to a further preferred implementation form of the first aspect of the invention, the signal generation device further comprises a fading unit configured to apply fading to the at least one test signal. Additionally or alternatively, the signal generation device further comprises a noise unit configured to apply noise to the at least one test signal. Advantageously, measurements can be performed in a very flexible manner with respect to further influences such as fading or noise.

According to a second aspect of the invention, a spectrum analyzing device with correction parameter measurement is provided. Said spectrum analyzing device comprises a signal generating unit configured to provide at least one test signal for a device under test with the aid of a connection structure, and a correction parameter measurement unit configured to measure at least one correction parameter with respect to said connection structure. In this context, both the signal generating unit and the correction parameter measurement unit are integrated into one housing. Advantageously, in this manner, not only measurement efficiency but also accuracy can be ensured.

According to a first preferred implementation form of the second aspect of the invention, the at least one correction parameter is measured on the basis of the at least one test signal, especially provided for a first port of the connection structure, and at least one measured signal, especially measured at the first port of the connection structure and/or at a second port of the connection structure with the aid of the correction parameter measurement unit. Advantageously, measurement accuracy can further be increased.

According to a further preferred implementation form of the second aspect of the invention, the at least one test signal is a radio frequency signal, preferably a complex signal, more preferably a complex radio frequency signal. Advantageously, measurements are not limited to a certain kind of signal.

According to a further preferred implementation form of the second aspect of the invention, the spectrum analyzing device comprises a correction parameter measuring mode. Advantageously, said correction parameter or at least one correction parameter, respectively, can be measured in a most efficient manner.

According to a further preferred implementation form of the second aspect of the invention, the correction parameter measurement unit is configured to compare the at least one test signal, especially provided for a first port of the connection structure, with at least one measured signal, especially measured at the first port of the connection structure and/or at a second port of the connection structure with the aid of the correction parameter measurement unit. Advantageously, measurement errors can further be reduced.

According to a further preferred implementation form of the second aspect of the invention, the at least one correction parameter comprises at least one scattering parameter of the connection structure. Advantageously, measurement accuracy can further be increased especially by correcting the respective frequency response.

According to a further preferred implementation form of the second aspect of the invention, the spectrum analyzing device is configured to indicate the at least one correction parameter to a user. Additionally or alternatively, the correction parameter measurement unit is configured to indicate the at least one correction parameter to the user. Advantageously, measurements can be performed in a time-saving, and thus also efficient, manner.

According to a further preferred implementation form of the second aspect of the invention, the spectrum analyzing device further comprises a sweep filter configured to apply a sweep, especially a frequency sweep, to the at least one test signal. Additionally or alternatively, the spectrum analyzing device further comprises at least one of a peak-detector, an auto-peak-detector, a sample-detector, and a route-mean-square-detector. Advantageously, measurements can be performed in a very flexible manner with respect to various measurement parameters.

According to a third aspect of the invention, a signal generation method with correction parameter measurement is provided. Said signal generation method comprises the steps of providing at least one test signal for a device under test with the aid of a signal generating unit via a connection structure, and measuring at least one correction parameter with respect to said connection structure with the aid of a correction parameter measurement unit. In this context, both the signal generating unit and the correction parameter measurement unit are integrated into one housing. Advantageously, in this manner, not only measurement efficiency but also accuracy can be ensured.

According to a first preferred implementation form of the third aspect of the invention, the at least one correction parameter is measured on the basis of the at least one test signal, especially provided for a first port of the connection structure, and at least one measured signal, especially measured at the first port of the connection structure and/or at a second port of the connection structure with the aid of the correction parameter measurement unit. Advantageously, measurement accuracy can further be increased.

According to a further preferred implementation form of the third aspect of the invention, the at least one test signal is a radio frequency signal, preferably a complex signal, more preferably a complex radio frequency signal. Advantageously, measurements are not limited to a certain kind of signal.

According to a further preferred implementation form of the third aspect of the invention, the signal generation method further comprises the step of with the aid of the correction parameter measurement unit, comparing the at least one test signal, especially provided for a first port of the connection structure, with at least one measured signal, especially measured at the first port of the connection structure and/or at a second port of the connection structure with the aid of the correction parameter measurement unit. Advantageously, measurement errors can further be reduced.

According to a further preferred implementation form of the third aspect of the invention, the at least one correction parameter comprises at least one scattering parameter of the connection structure. Advantageously, measurement accuracy can further be increased especially by correcting the respective frequency response.

According to a further preferred implementation form of the third aspect of the invention, the signal generation method further comprises the step of applying fading to the at least one test signal with the aid of a fading unit. Advantageously, measurements can be performed in a very flexible manner with respect to further influences such as fading or noise.

According to a further preferred implementation form of the third aspect of the invention, the signal generation method further comprises the step of applying noise to the at least one test signal with the aid of a noise unit.

According to a further preferred implementation form of the third aspect of the invention, the signal generation method further comprises the step of indicating the at least one correction parameter to a user with the aid of the correction parameter measurement unit. Advantageously, measurements can be performed in a time-saving, and thus also efficient, manner.

According to a fourth aspect of the invention, a spectrum analyzing method with correction parameter measurement is provided. Said spectrum analyzing method comprises the steps of providing at least one test signal for a device under test with the aid of a signal generating unit via a connection structure, and measuring at least one correction parameter with respect to said connection structure with the aid of a correction parameter measurement unit. In this context, both the signal generating unit and the correction parameter measurement unit are integrated into one housing. Advantageously, in this manner, not only measurement efficiency but also accuracy can be ensured.

According to a first preferred implementation form of the fourth aspect of the invention, the at least one correction parameter is measured on the basis of the at least one test signal, especially provided for a first port of the connection structure, and at least one measured signal, especially measured at the first port of the connection structure and/or at a second port of the connection structure with the aid of the correction parameter measurement unit. Advantageously, measurement accuracy can further be increased.

According to a further preferred implementation form of the fourth aspect of the invention, the at least one test signal is a radio frequency signal, preferably a complex signal, more preferably a complex radio frequency signal. Advantageously, measurements are not limited to a certain kind of signal.

According to a further preferred implementation form of the fourth aspect of the invention, the spectrum analyzing method further comprises the step of with the aid of the correction parameter measurement unit, comparing the at least one test signal, especially provided for a first port of the connection structure, with at least one measured signal, especially measured at the first port of the connection structure and/or at a second port of the connection structure with the aid of the correction parameter measurement unit. Advantageously, measurement errors can further be reduced.

According to a further preferred implementation form of the fourth aspect of the invention, the at least one correction parameter comprises at least one scattering parameter of the connection structure. Advantageously, measurement accuracy can further be increased especially by correcting the respective frequency response.

According to a further preferred implementation form of the fourth aspect of the invention, the spectrum analyzing method further comprises the step of indicating the at least one correction parameter to a user with the aid of the correction parameter measurement unit. Advantageously, measurements can be performed in a time-saving, and thus also efficient, manner.

According to a further preferred implementation form of the fourth aspect of the invention, the spectrum analyzing method further comprises the step of applying a sweep, especially a frequency sweep, to the at least one test signal with the aid of a sweep filter. Additionally or alternatively, the spectrum analyzing method further comprises the step of applying at least one of a peak-detector, an auto-peak-detector, a sample-detector, and a route-mean-square-detector with respect to the at least one test signal. Advantageously, measurements can be performed in a very flexible manner with respect to various measurement parameters.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
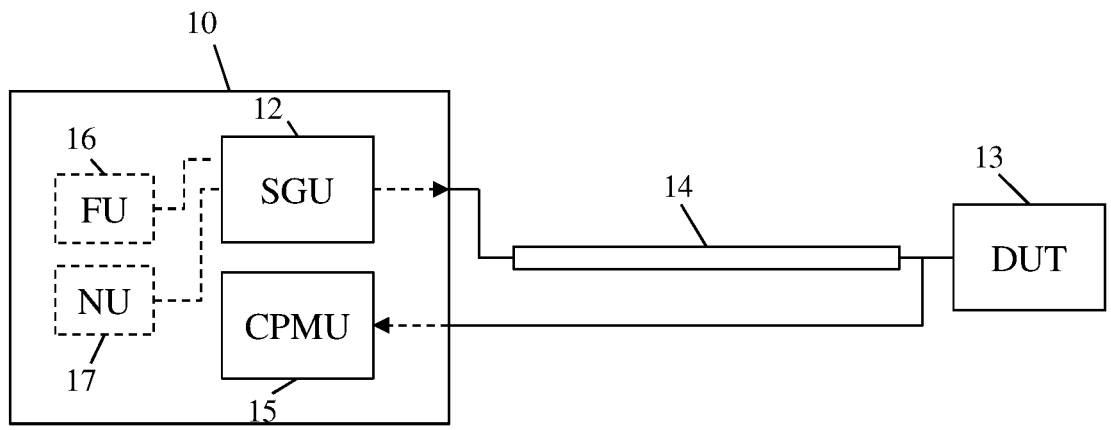
FIG. 1 shows an exemplary embodiment of the first aspect of the invention.

Firstly, FIG. 1 illustrates an exemplary embodiment of an inventive signal generation device 10 with correction parameter measurement. Said signal generation device 10 comprises a signal generating unit 12 configured to provide at least one test signal for a device under test 13 with the aid of a connection structure 14, especially comprising a cable and/or a stripline, and a correction parameter measurement unit 15 configured to measure at least one correction parameter with respect to said connection structure 14. As it can be seen, both the signal generating unit 12 and the correction parameter measurement unit 15 are integrated into one housing.

In this context, the at least one correction parameter is especially measured on the basis of the at least one test signal, especially provided for a first port of the connection structure 14, and at least one measured signal, especially measured at the first port of the connection structure 14 and/or at a second port of the connection structure 14 with the aid of the correction parameter measurement unit 15.

It is noted that the at least one test signal especially is a radio frequency signal, preferably a complex signal, more preferably a complex radio frequency signal.

Furthermore, it should be mentioned that the signal generation device 10 preferably comprises a correction parameter measuring mode.

In addition to this, the correction parameter measurement unit 15 is preferably configured to compare the at least one test signal, especially provided for the first port of the connection structure 14, with at least one measured signal, especially measured at the first port of the connection structure 14 and/or at the second port of the connection structure 14 with the aid of the correction parameter measurement unit 15.

In this context, it is noted that it might be particularly advantageous if the at least one correction parameter preferably comprises at least one scattering parameter of the connection structure 14.

Moreover, the signal generation device 10 is especially configured to indicate the at least one correction parameter to a user. Additionally or alternatively, the correction parameter measurement unit is preferably configured to indicate the at least one correction parameter to the user.

As it can also be seen from FIG. 1, the signal generation device 10 may further comprise a fading unit 16 configured to apply fading to the at least one test signal. For this purpose, said fading unit 16 may especially be connected to the signal generating unit 12. Additionally or alternatively, the signal generation device 10 may further comprise a noise unit 17 configured to apply noise to the at least one test signal. For this purpose, said noise unit 17 may especially be connected to the signal generating unit 12.

Figure 2:
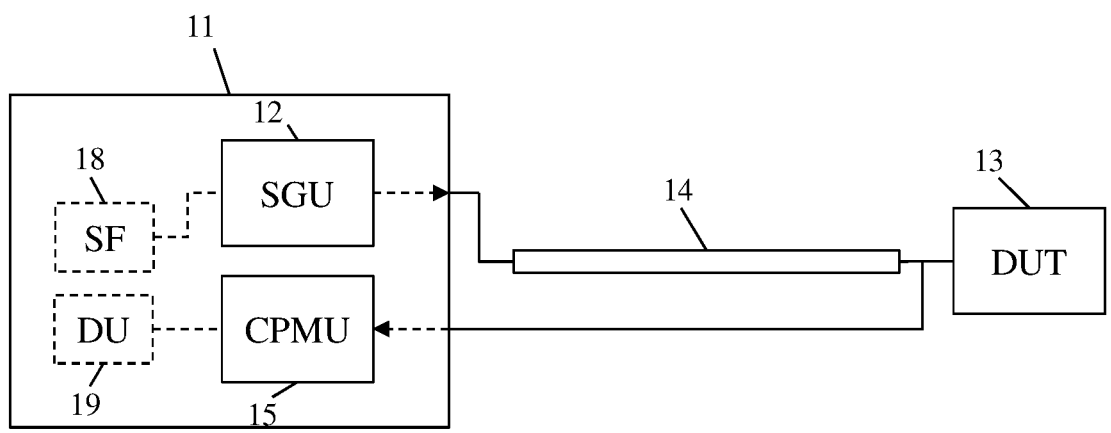
FIG. 2 shows an exemplary embodiment of the second aspect of the invention.

Now, with respect to FIG. 2, an exemplary embodiment of an inventive spectrum analyzing device 11 with correction parameter measurement is depicted. Said spectrum analyzing device 11 comprises a signal generating unit 12 configured to provide at least one test signal for a device under test 13 with the aid of a connection structure 14, especially comprising a cable and/or a stripline, and a correction parameter measurement unit 15 configured to measure at least one correction parameter with respect to said connection structure 14. As it can be seen, both the signal generating unit 12 and the correction parameter measurement unit 15 are integrated into one housing.

In this context, the at least one correction parameter is preferably measured on the basis of the at least one test signal, especially provided for a first port of the connection structure 14, and at least one measured signal, especially measured at the first port of the connection structure 14 and/or at a second port of the connection structure 14 with the aid of the correction parameter measurement unit 15.

It should further be mentioned that the at least one test signal especially is a radio frequency signal, preferably a complex signal, more preferably a complex radio frequency signal.

In this context, it is noted that the spectrum analyzing device 11 preferably comprises a correction parameter measuring mode.

Furthermore, the correction parameter measurement unit 15 is preferably configured to compare the at least one test signal, especially provided for the first port of the connection structure 14, with at least one measured signal, especially measured at the first port of the connection structure 14 and/or at the second port of the connection structure 14 with the aid of the correction parameter measurement unit 15.

It might be further advantageous, if the at least one correction parameter especially comprises at least one scattering parameter of the connection structure, especially the reflection scattering parameters $S_{11}$ and $S_{22}$ and the transmission scattering parameters $S_{12}$ and $S_{21}$.

Moreover, the spectrum analyzing device 11 is preferably configured to indicate the at least one correction parameter to a user. In addition to this or as an alternative, the correction parameter measurement unit 15 is especially configured to indicate the at least one correction parameter to the user.

Furthermore, the spectrum analyzing device 11 may further comprise a sweep filter 18 configured to apply a sweep, especially a frequency sweep, to the at least one test signal. Additionally or alternatively, the spectrum analyzing device 11 may further comprise a detector unit 19 especially comprising at least one of a peak-detector, an auto-peak-detector, a sample-detector, and a route-mean-square-detector.

Figure 3:
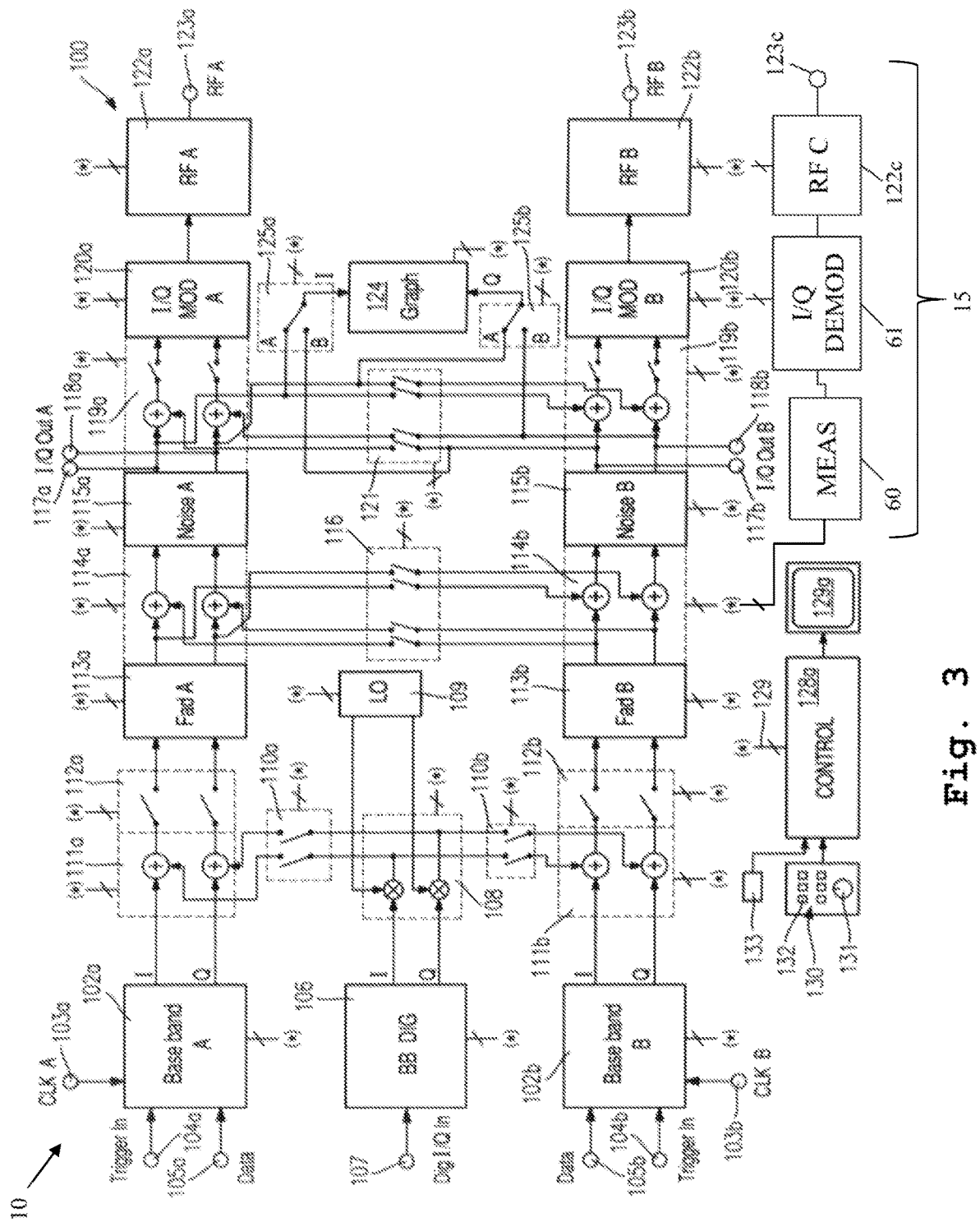
FIG. 3 shows a further exemplary embodiment of the first aspect of the invention in more detail.

Now, FIG. 3 illustrates an exemplary embodiment of the inventive signal generation device 10 according to FIG. 1 in more detail.

In this exemplary case, the correction parameter measurement unit 15 of the signal generation device 10 comprises a port 123c, especially an input port, a radio frequency unit 122c, an I/Q demodulator 61, and a measurement unit 60.

It is noted that the remaining parts of the signal generation device 10, especially its signal generation parts, will be discussed in detail in the following.

As it can be seen from FIG. 3, the signal generation device 10 further comprises a first baseband unit 102a and a second baseband unit 102b.

At their I and Q outputs, the baseband units 102a and 102b generate baseband signals according to specified standards, which can be selected by the user, for example according to the GSM standard, the 3G, 4G or 5G standard or any wideband CDMA standard. The baseband units 102a, 102b can be supplied respectively with clock signals at ports 103a or 103b, with trigger signals at ports 104a or 104b and with modulation data at ports 105a and/or 105b. A digital baseband generator unit 106, which generates the I and Q components of a further baseband signal from the digital I/Q values supplied to a port 107, is additionally provided in the exemplary embodiment shown. The output signal of the digital baseband generator 106 can be multiplied in a multiplier unit 108, to which the constant frequency of an adjustable local oscillator 109 is supplied.

The optionally upwardly-mixed baseband signal of the digital baseband generator unit 106 is supplied via a switching unit 110a or respectively a second switching unit 110b to a digital adder 111a or respectively a digital adder 111b.

The output signal of the baseband units 102a and 102b or respectively of the adders 111a and 111b is supplied via a switching unit 112a or respectively 112b to a fading unit 113a or respectively 113b, which provides the baseband signal with a fading (variable fading). The functions of the fading units 113a and 113b, for example, the number, the time delay and the attenuation of the signal delay paths implemented in the fading unit, can be set by the user. The fading units 113a and 113b are connected respectively via an adder 114a or respectively 114b to a noise unit 115a or respectively 115b. The noise units 115a, 115b provide the baseband signal with a noise signal which can be specified by the user, wherein, for example, the noise type and the level of the noise signal generated by the noise unit 115a, 115b can be selected by the user.

The output signals of the fading units 113a, 113b can also be added, via a switching unit 116 connecting the adders 114a and 114b, instead of via a separate connection of the respective fading unit 113a or respectively 113b, to the assigned noise unit 115a or respectively 115b, and supplied to one of the two noise units 115a or respectively 115b. The I/Q output signals at the output of the noise units 115a or respectively 115b can be de-coupled at the ports 117a and 118a or respectively 117b and 118b.

The output signals of the noise units 117a and 117b can be supplied to I/Q modulators 120a or respectively 120b via addition and switching units 119a and 119b. Here also, the output signals of the noise units 115a and 115b can be added via a switching unit 121 and supplied to one of the two I/Q modulators 120a or respectively 120b. Several user-specific selection options are also available with regard to the function of the I/Q modulator 120a, 120b. For example, the I/Q modulator 120a, 120b can be operated in such a manner that it generates a burst sequence and the active bursts or the level of the active bursts can be selected by the user.

The I/Q modulators 120a and 120b are each connected to a high-frequency unit 122a or respectively 122b, and the high-frequency signal can be picked up at a port 123a and/or 123b, which are especially output ports. For example, the output frequency or several output frequencies initiated in the sudden-frequency change process of the high-frequency units 122a and 122b can be selected by the user.

A signal display 124, which, in the exemplary embodiment shown, can be connected via the switching units 125a or respectively 125b to the output of the noise unit 115a or the noise unit 115b, is additionally provided. Alternatively, a connection of the display device 124 directly to the outputs of the baseband units 102a and 102b is also conceivable. The signal display 124 allows, for example, a presentation of the configuration diagram, so that the user can check the method of operation of the connected signal path.

Additional functional units can also be present, and further combination variants of the functional units, which are not presented here for reasons of logical presentation, may also be possible.

All of the functional units 102a, 102b, 106, 108, 109, 110a, 110b, 111a, 111b, 112a, 112b, 113a, 113b, 114a, 114b, 115a, 115b, 116, 119a, 119b, 120a, 120b, 121, 122a, 122b, 124 and 126 are connected to a control device 128a, for example, a CPU, via a control bus 129, of which the connection to the functional units is marked with the symbol (*). The control unit 128a controls the interconnection and function of the individual functional units required by the user. The current interconnection of the functional units is displayed on a display device (display) 129a, which can be disposed, together with the control elements 130, on the front panel of the signal generation device 10. For this purpose, a graphic functional block is assigned to each of the functional units, and the connection of the functional units is displayed on the display device 129 by means of corresponding connecting elements, which connect the functional blocks to one another. The connections of the functional blocks and the functions of the functional blocks are selected either by means of a rotary knob 131 and/or corresponding operating keys 132 or via a movable positioning element 133 (mouse).

Figure 4:
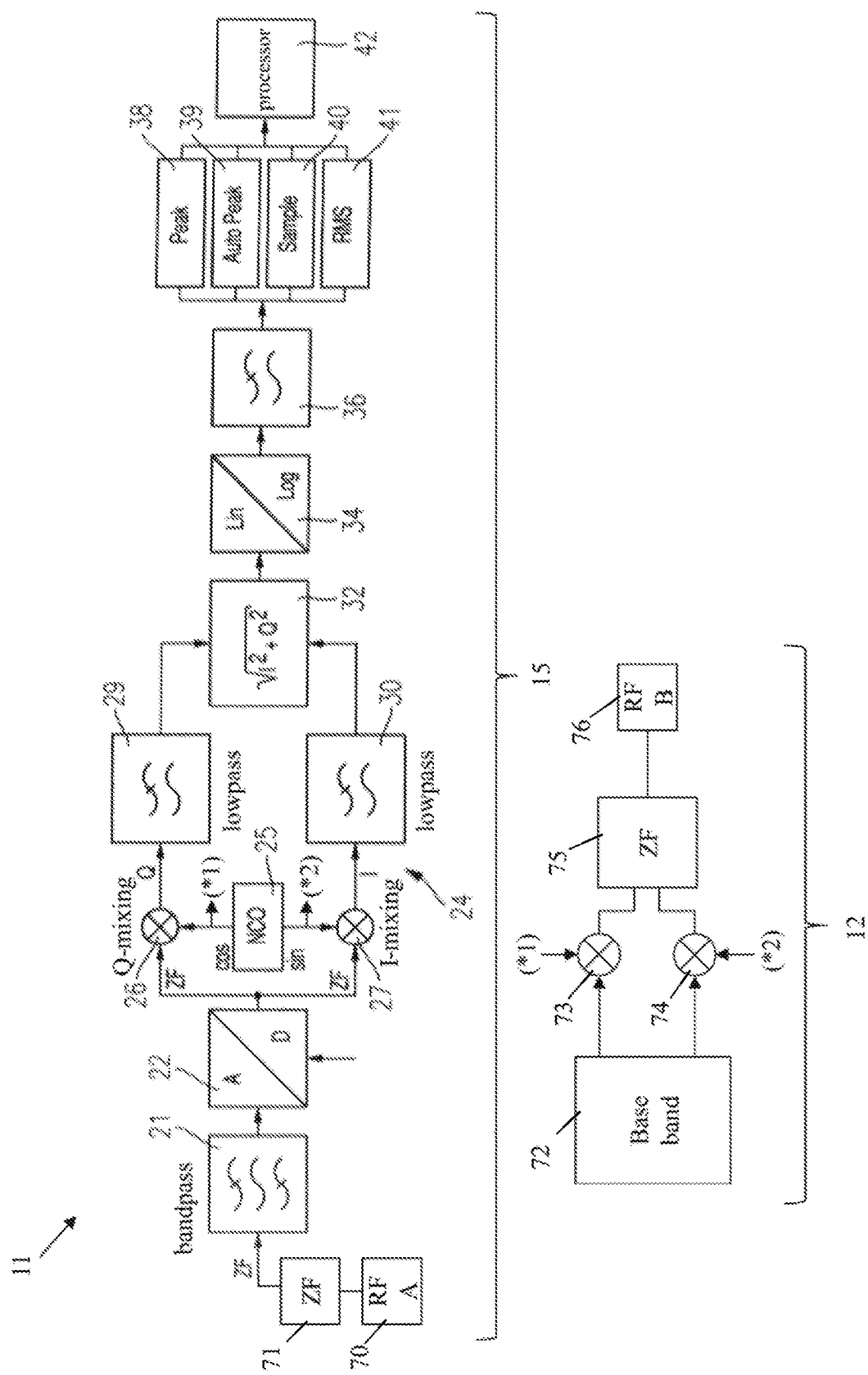
FIG. 4 shows a further exemplary embodiment of the second aspect of the invention in more detail.

In this context, it is noted that the local oscillator frequency required for modulation and demodulation may advantageously be provided by the same local oscillator, which may also apply for the inventive spectrum analyzing device 11 according to FIG. 2 or FIG. 4, respectively.

With the signal generation device 10 described above, it should be mentioned that the functional units are replaceable and/or can be added and omitted in a variable manner, so that the signal generation device 10 is advantageously configurable with a different performance, the performance being dependent upon the functional properties of the functional units.

For example, the functional properties of the baseband units 102a, 102b are characterised by the number of codable standards, e.g. GSM, EDGE, 3G, 4G, 5G, W-CDMA, COFDM for wireless LAN etc.

The functional properties of the fading units 113a, 113b can be characterized by the number of delay channels, wherein each delay channel creates an additional memory requirement and therefore causes additional costs. Dependent upon the performance required, a fading unit with a different number of delay channels can be used in the signal generation device 10.

The functional property of the noise units 117a, 117b can be characterized by the number of emulatable noise types (thermal noise, white noise, 1/f noise etc.).

The functional properties of the I/Q modulators 120a, 120b can be characterized by the bandwidth and/or the linear dynamic range and/or the I/Q imbalance and other parameters characterizing the quality of the I/Q modulators, which can analogously be applied to the I/Q demodulator 61.

The functional properties of the high-frequency units 122a, 122b, 122c can be characterized by the bandwidth and/or the linear dynamic range and/or the output power.

Furthermore, FIG. 4 shows an exemplary embodiment of the inventive spectrum analyzing device 11 according to FIG. 2 in more detail.

In this exemplary case, the signal generating unit 12 of the spectrum analyzing device 11 comprises a baseband unit 72, a first mixer 73, especially being part of an I/Q modulator and preferably used for Q-mixing, a second mixer 74, especially being part of said I/Q modulator and preferably used for I-mixing, an intermediate frequency unit 75, and a radio frequency unit 76 preferably comprising a port, especially an output port.

It is noted that the remaining parts of the spectrum analyzing device 11, especially its spectrum analyzing parts or its correction parameter measurement parts, respectively, will be discussed in detail in the following.

As it can be seen from FIG. 4, the intermediate-frequency signal provided by an intermediate frequency unit 71 connected to a radio frequency unit 70 preferably comprising a port, especially an input port, indicated with the reference ZF, is filtered in a bandpass filter 21. This bandpass filter 21 can be a first replaceable functional unit, wherein the functional properties in this context can be the bandwidth and/or the noise-to-signal ratio of the signal and/or the linear dynamic range and/or the input sensitivity. The bandpass filter 21 is connected to an analog-digital converter 22. This analog-digital converter 22 is another replaceable functional unit with functional properties characterised by the dynamic range and/or the converter rate and/or the resolution and/or the accuracy.

This is followed by the I/Q mixing 23 in an I/Q demodulator 24, which conventionally consists of a local oscillator 25 with two outputs with a 90° phase displacement, which together with the filtered and analog-digital-converted intermediate-frequency signals are supplied respectively to a mixer 27 of the I branch and a mixer 26 of the Q branch. This I/Q demodulator 24 represents a further replaceable functional unit, which is available with different bandwidth and/or different linear dynamic range and/or different I/Q imbalance etc., and can be incorporated with a different quality dependent upon the requirements for the quality of signal processing.

This is followed by the digital IF filtering with two low-pass filters 29, 30, which can also be designed as replaceable, variable functional units, wherein the edge steepness of the low-pass filter and the aliasing-free, useful frequency range can characterise the functional properties in this context.

The envelope-curve rectification takes place after this in an envelope-curve rectifier 32, which represents a further replaceable functional unit. The logarithm formation 33 takes place in a log module 34, which represents another replaceable functional unit with different functional properties. The log module 34 may especially be followed by a video filter 36, in which the video filtering 35 takes place. The video filter 36 represents the next replaceable functional unit and can be adapted with respect to the respective use case.

Furthermore, different detectors 38 to 41, for example, a peak detector 38, an auto-peak detector 39, a sample detector 40 and an RMS (Route Mean Square) detector 41 are provided for the detection 37. Dependent upon the requirements, either all four detectors are incorporated with a high-performance spectrum analyzing device 11, or only certain detectors, for example, with specialized measuring tasks, only a single detector, may be incorporated, thereby creating a spectrum analyzing device 11 for a special application.

Evaluation and control are implemented via a microprocessor 42, which can also be formed as a replaceable functional unit, wherein different processors with different computational rates, different cash memories etc. can be used dependent upon the performance of the spectrum analysing device 11.

Figure 5:
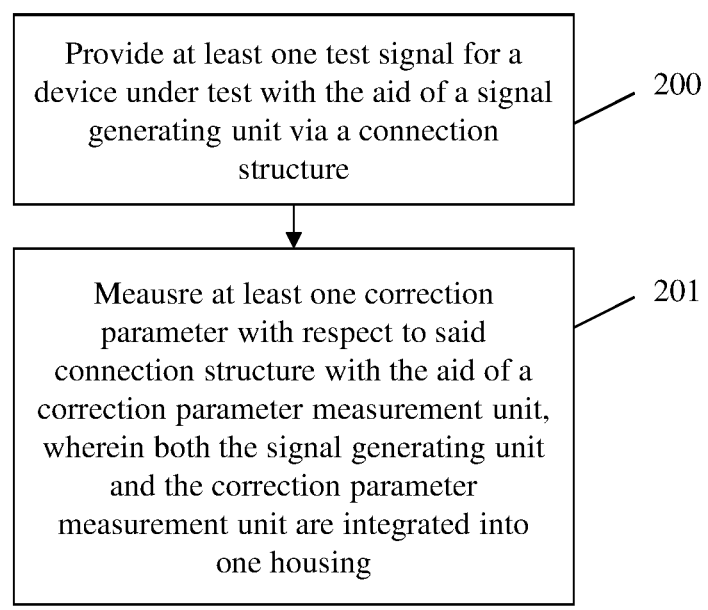
FIG. 5 shows a flow chart of an exemplary embodiment of the third aspect of the invention.

Now, with respect to FIG. 5, a flow chart of an exemplary embodiment of the inventive signal generation method is shown. In a first step 200, at least one test signal is provided for a device under test with the aid of a signal generating unit via a connection structure. Then, in a second step 201, at least one correction parameter is measured with respect to said connection structure with the aid of a correction parameter measurement unit, wherein both the signal generating unit and the correction parameter measurement unit are integrated into one housing.

In this context, the at least one correction parameter may be measured on the basis of the at least one test signal, especially provided for a first port of the connection structure, and at least one measured signal, especially measured at the first port of the connection structure and/or at a second port of the connection structure with the aid of the correction parameter measurement unit.

In addition to this, the at least one test signal may be a radio frequency signal, preferably a complex signal, more preferably a complex radio frequency signal.

Furthermore, the signal generation method may further comprise the step of with the aid of the correction parameter measurement unit, comparing the at least one test signal, especially provided for a first port of the connection structure, with at least one measured signal, especially measured at the first port of the connection structure and/or at a second port of the connection structure with the aid of the correction parameter measurement unit.

Additionally, the at least one correction parameter may advantageously comprise at least one scattering parameter of the connection structure.

Moreover, the signal generation method may further comprise the step of applying fading to the at least one test signal with the aid of a fading unit.

In addition to this or as an alternative, the signal generation method may further comprise the step of applying noise to the at least one test signal with the aid of a noise unit.

It might be advantageous, if the signal generation method further comprises the step of indicating the at least one correction parameter to a user with the aid of the correction parameter measurement unit.

Figure 6:
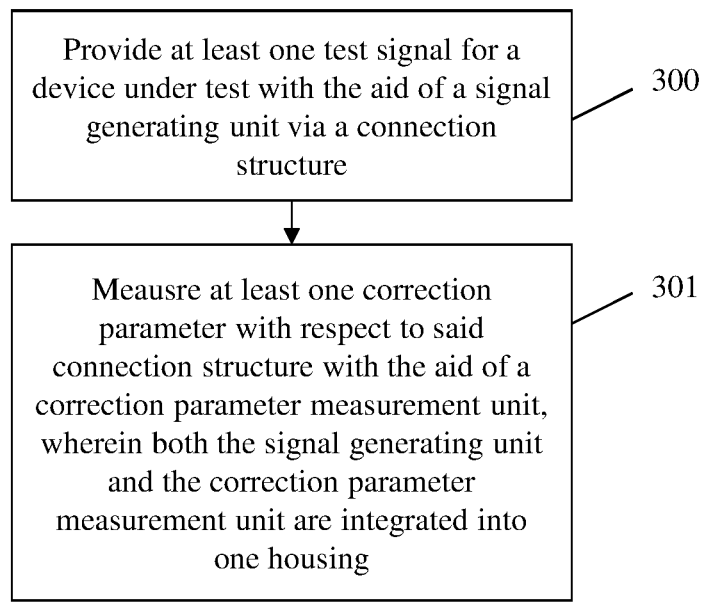
FIG. 6 shows a flow chart of an exemplary embodiment of the fourth aspect of the invention.

Finally, FIG. 6 shows a flow chart of an exemplary embodiment of the inventive spectrum analyzing method. In a first step 200, at least one test signal is provided for a device under test with the aid of a signal generating unit via a connection structure. Then, in a second step 201, at least one correction parameter is measured with respect to said connection structure with the aid of a correction parameter measurement unit, wherein both the signal generating unit and the correction parameter measurement unit are integrated into one housing.

In this context, the at least one correction parameter may be measured on the basis of the at least one test signal, especially provided for a first port of the connection structure, and at least one measured signal, especially measured at the first port of the connection structure and/or at a second port of the connection structure with the aid of the correction parameter measurement unit.

In addition to this, the at least one test signal may be a radio frequency signal, preferably a complex signal, more preferably a complex radio frequency signal.

Moreover, the spectrum analyzing method may further comprise the step of with the aid of the correction parameter measurement unit, comparing the at least one test signal, especially provided for a first port of the connection structure, with at least one measured signal, especially measured at the first port of the connection structure and/or at a second port of the connection structure with the aid of the correction parameter measurement unit.

It might be advantageous, if the at least one correction parameter comprises at least one scattering parameter of the connection structure, especially the reflection scattering parameters $S_{11}$ and $S_{22}$ and the transmission scattering parameters $S_{12}$ and $S_{21}$.

Additionally, the spectrum analyzing method may further comprise the step of indicating the at least one correction parameter to a user with the aid of the correction parameter measurement unit.

In addition to this or as an alternative, the spectrum analyzing method may further comprise the step of applying a sweep, especially a frequency sweep, to the at least one test signal with the aid of a sweep filter. Additionally or alternatively, the spectrum analyzing method may further comprise the step of applying at least one of a peak-detector, an auto-peak-detector, a sample-detector, and a route-mean-square-detector with respect to the at least one test signal.

While various embodiments of the present invention have been described above, it should be understood that they have been presented by way of example only, and not limitation. Numerous changes to the disclosed embodiments can be made in accordance with the disclosure herein without departing from the spirit or scope of the invention. For example, a current may be measured instead of a voltage. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A signal generation device with correction parameter measurement, the signal generation device comprising:
   a signal generating unit configured to provide at least one test signal for a device under test with the aid of a connection structure comprising a cable and/or a stripline comprising a first port and a second port, and
   a correction parameter measurement unit configured to measure at least one correction parameter with respect to the first port and/or the second port of said connection structure,
   wherein the correction parameter measurement unit is configured to indicate the at least one correction parameter to a user,
   wherein the at least one correction parameter comprises at least one scattering parameter of the first port and/or the second port of the connection structure,
   wherein both the signal generating unit and the correction parameter measurement unit are integrated into one housing, and
   wherein the signal generation device comprises a correction parameter measuring mode.

2. The signal generation device according to claim 1, wherein the at least one correction parameter is measured on the basis of the at least one test signal provided for the first port of the connection structure, and at least one measured signal measured at the first port of the connection structure and/or at the second port of the connection structure with the aid of the correction parameter measurement unit.

3. The signal generation device according to claim 1, wherein the at least one test signal is a radio frequency signal.

4. The signal generation device according to claim 1, wherein the correction parameter measurement unit is configured to compare the at least one test signal provided for a first port of the connection structure, with at least one measured signal measured at the first port of the connection structure and/or at the second port of the connection structure with the aid of the correction parameter measurement unit.

5. The signal generation device according to claim 1, wherein the signal generation device is configured to indicate the at least one correction parameter to the user.

6. The signal generation device according to claim 1, wherein the signal generation device further comprises a fading unit configured to apply fading to the at least one test signal, or
   wherein the signal generation device further comprises a noise unit configured to apply noise to the at least one test signal.

7. A spectrum analyzing device with correction parameter measurement, the spectrum analyzing device comprising:

a signal generating unit configured to provide at least one test signal for a device under test with the aid of a connection structure comprising a cable and/or a stripline comprising a first port and a second port, and a correction parameter measurement unit configured to measure at least one correction parameter with respect to the first port and/or the second port of said connection structure, wherein the correction parameter measurement unit is configured to indicate the at least one correction parameter to a user, wherein the at least one correction parameter comprises at least one scattering parameter of the first port and/or the second port of the connection structure, wherein both the signal generating unit and the correction parameter measurement unit are integrated into one housing, and wherein the spectrum analyzing device comprises a correction parameter measuring mode.

8. The spectrum analyzing device according to claim 7, wherein the at least one correction parameter is measured on the basis of the at least one test signal provided for the first port of the connection structure, and at least one measured signal measured at the first port of the connection structure and/or at the second port of the connection structure with the aid of the correction parameter measurement unit.

9. The spectrum analyzing device according to claim 7, wherein the spectrum analyzing device further comprises a sweep filter configured to apply a sweep to the at least one test signal, or wherein the spectrum analyzing device further comprises at least one of a peak-detector, an auto-peak-detector, a sample-detector, and a route-mean-square-detector.

10. A signal generation method with correction parameter measurement, the signal generation method comprising the steps of:

providing at least one test signal for a device under test with the aid of a signal generating unit via a connection structure comprising a cable and/or a stripline comprising a first port and a second port, measuring at least one correction parameter with respect to a first port and/or the second port of said connection structure with the aid of a correction parameter measurement unit, indicating the at least one correction parameter to a user with the aid of the correction parameter measurement unit, and providing a correction parameter measuring mode, wherein the at least one correction parameter comprises at least one scattering parameter of the first port and/or the second port of the connection structure, and wherein both the signal generating unit and the correction parameter measurement unit are integrated into one housing.

11. The signal generation method according to claim 10, wherein the at least one correction parameter is measured on the basis of the at least one test signal provided for the first port of the connection structure, and at least one measured signal measured at the first port of the connection structure and/or at the second port of the connection structure with the aid of the correction parameter measurement unit.

12. The signal generation method according to claim 10, wherein the at least one test signal is a radio frequency signal.

13. The signal generation method according to claim 10, wherein the signal generation method or the spectrum analyzing method further comprises the step of with the aid of the correction parameter measurement unit, comparing the at least one test signal provided for the first port of the connection structure, with at least one measured signal measured at the first port of the connection structure and/or at the second port of the connection structure with the aid of the correction parameter measurement unit.

14. The signal generation method according to claim 10, wherein the signal generation method further comprises the step of applying fading to the at least one test signal with the aid of a fading unit.

15. The signal generation method according to claim 10, wherein the signal generation method further comprises the step of applying noise to the at least one test signal with the aid of a noise unit.

16. A spectrum analyzing method with correction parameter measurement, the spectrum analyzing method comprising the steps of:

providing at least one test signal for a device under test with the aid of a signal generating unit via a connection structure comprising a cable and/or a stripline comprising a first port and a second port, measuring at least one correction parameter with respect to the first port and/or the second port of said connection structure with the aid of a correction parameter measurement unit, indicating the at least one correction parameter to a user with the aid of the correction parameter measurement unit, and providing a correction parameter measuring mode, wherein the at least one correction parameter comprises at least one scattering parameter of the first port and/or the second port of connection structure, and wherein both the signal generating unit and the correction parameter measurement unit are integrated into one housing.

17. The spectrum analyzing method according to claim 16, wherein the at least one correction parameter is measured on the basis of the at least one test signal provided for the first port of the connection structure, and at least one measured signal measured at the first port of the connection structure or at the second port of the connection structure with the aid of the correction parameter measurement unit.

* * * * *